Patented Mar. 10, 1936

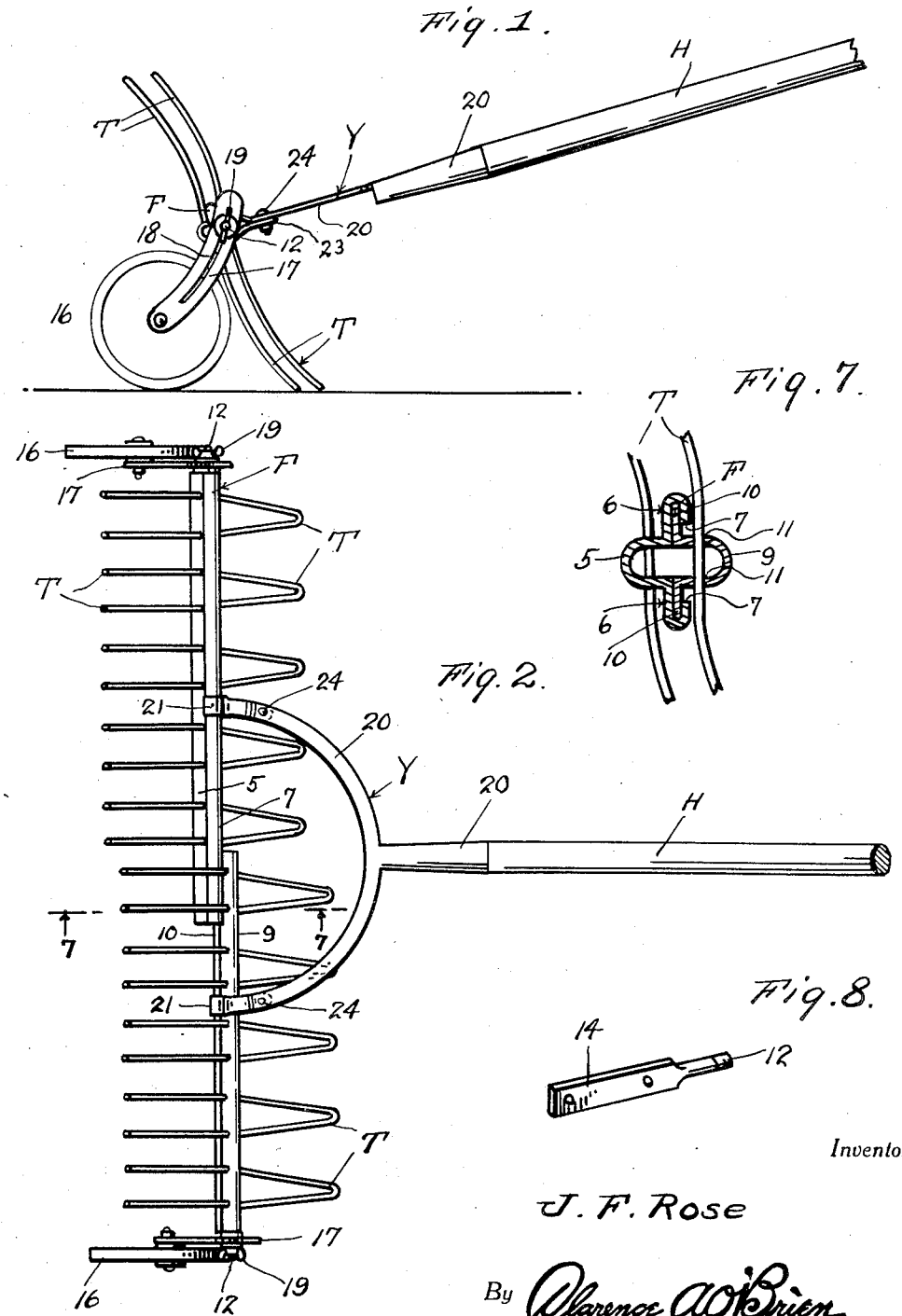

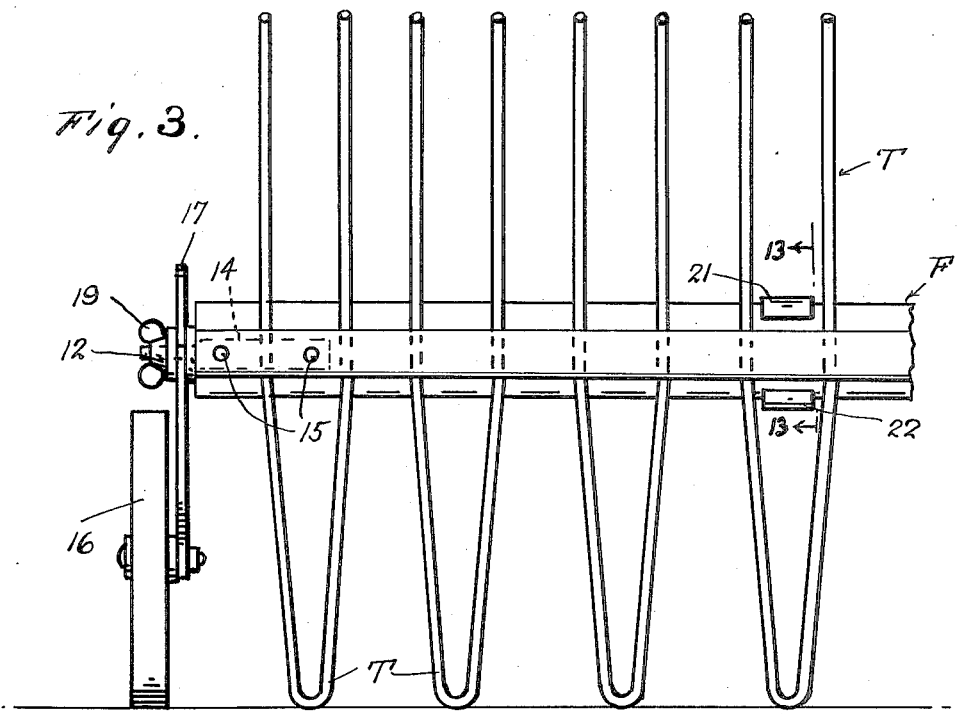
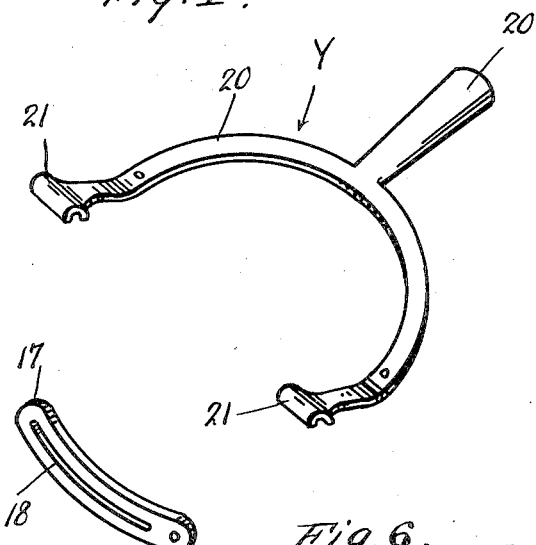
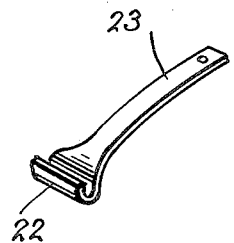

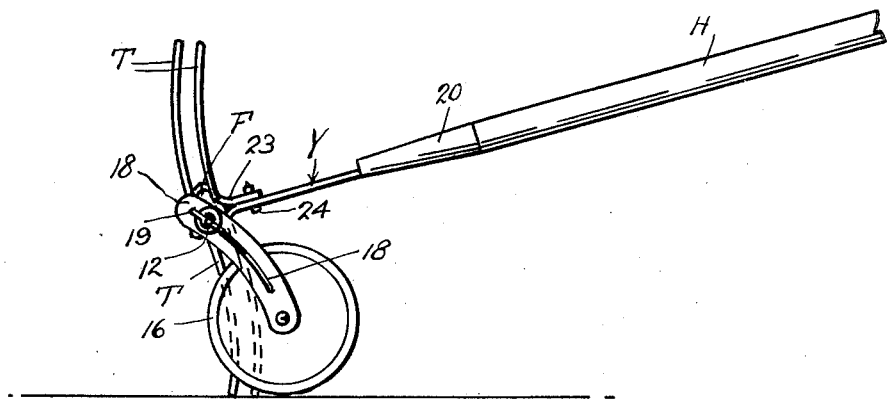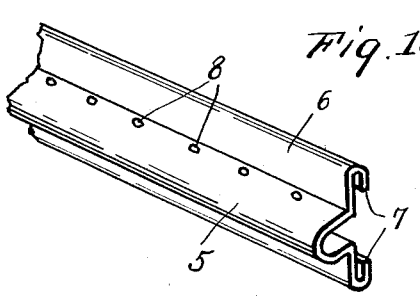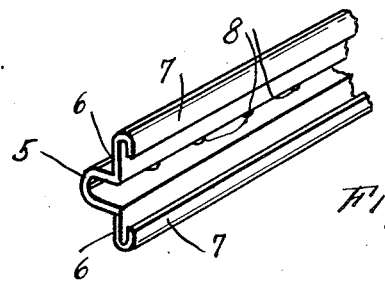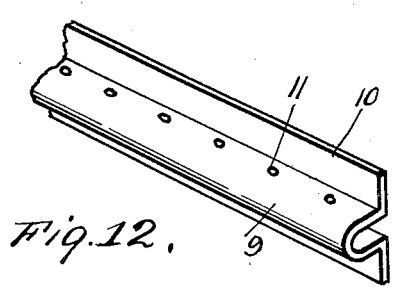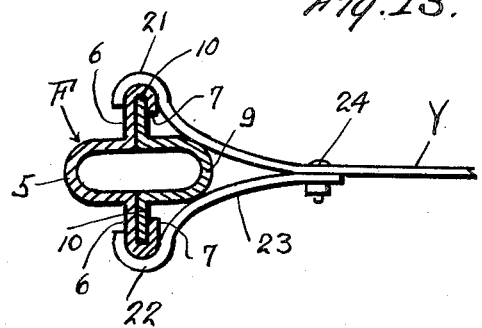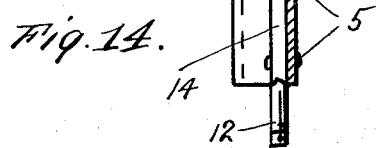

2,033,451

UNITED STATES PATENT OFFICE 2,033,451

RAKE

Joseph F. Rose, Battle Creek, Mich.

Application August 29, 1935, Serial No. 38,453

2 Claims. (Cl. 55—114)

The present invention relates to a rake and has for its prime object to provide means whereby a rake may be mounted on a mobile carriage so as to be pushed or pulled as may be convenient.

Another important object of the invention resides in the provision of a rake including a plurality of tines mounted on a frame, the structure of the frame being such that it may be adjusted laterally to different widths.

A still further important object of the invention resides in the provision of a rake of this nature which is comparatively simple in its construction, inexpensive to manufacture, strong and durable, easy to manipulate and handle and otherwise well adapted for the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a side elevation of a rake embodying the features of my invention showing the same in the pulling position.

Figure 2 is a top plan view thereof.

Figure 3 is a fragmentary enlarged front elevation thereof showing one end only.

Figure 4 is a perspective view of the yoke.

Figure 5 is a perspective view of one of the clamp elements associated therewith.

Figure 6 is a perspective view of one of the arms.

Figure 7 is a detail vertical transverse section taken substantially on the line 7—7 of Figure 2.

Figure 8 is a perspective view of one of the trunnions.

Figure 9 is a side elevation similar to Figure 1 but showing the parts in a pushing position.

Figure 10 is a perspective view of one of the frame members.

Figure 11 is another perspective thereof taken from a different viewpoint.

Figure 12 is a perspective view of the other frame member.

Figure 13 is a detail sectional view taken substantially on the line 13—13 of Figure 3.

Figure 14 is a detail sectional view showing one of the trunnions fixed to one of the frame members.

Referring to the drawings in detail it will be seen that the letter F denotes generally a frame consisting of a pair of telescopically associated members one of which has a U-shaped intermediate portion 5 merging at its edges into laterally disposed extensions 6 which in turn merge into overlapping flanges 7. The sides of the portion 5 are provided with openings 8. The other member of the frame is provided with an intermediate U-shaped portion 9 the edges of which merge into outwardly extending flanges 10 slidable in the space between the extension 6 and the flanges 7, as shown to advantage in Figure 13 and the sides of the portion 9 are provided with openings 11 which are adapted as far as necessary to be placed in registry with the openings 8 depending, of course, on the width of the frame desired.

Trunnions 12 extend from plates 14 and these plates 14 are riveted or otherwise secured as indicated at 15 in the ends of the members of the frame F. Arms 17 preferably of a curved formation are provided with similarly longitudinal curved slots 18 and receive the trunnions 12 so that they may be fixed in adjusted position by thumb nuts 19. Wheels 16 are rotatably mounted on the ends of these arms 18. The arms may be adjusted to the position shown in Figure 1 for pulling position or in the position shown in Figure 9 for pushing position.

I provide a plurality of tines T of U-shaped formation which are frictionally mounted in the openings 8 and 11. It will be noted that these tines have the lower portions of the legs thereof converging downwardly toward the bights.

A handle H is mounted in a yoke Y. This yoke Y includes socket 20 merging into the center of an arcuate member 21 the ends of which terminate in inverted arcuate terminals 21 for engaging over the bight connections of extensions 6 and flanges 7. Similar terminals 22 are formed on shanks 23 bolted or otherwise secured as at 24 with the member 20 to engage under the bights joining the extension 6 and the flange 7 at the bottom of the frame.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

1. A rake of the class described including a frame, tines in the frame, said frame being adjustable laterally, said frame including a pair of members each of which has a U-shaped intermediate portion with extensions extending laterally therefrom and one of the members having overlapping flanges to provide for a telescopic association therebetween.

2. A rake of the class described including a frame, tines in the frame, said frame being adjustable laterally, said frame including a pair of members each of which has a U-shaped intermediate portion with extensions extending laterally therefrom and one of the members having over-lapping flanges to provide for telescopic association therebetween, a handle including a yoke having arcuate end portions, and shanks having similar arcuate opposed end members and secured to the yoke to hold between the end members the frame by engaging about the over-lapping flanges.

JOSEPH F. ROSE.